US012039922B2

(12) United States Patent
Mercier

(10) Patent No.: US 12,039,922 B2
(45) Date of Patent: Jul. 16, 2024

(54) LIGHT EMITTING DIODE DISPLAY PIXEL

(71) Applicant: Aledia, Echirolles (FR)

(72) Inventor: Frédéric Mercier, Coublevie (FR)

(73) Assignee: Aledia, Echirolles (FR)

( * ) Notice: Subject to any disclaimer, the term of this patent is extended or adjusted under 35 U.S.C. 154(b) by 0 days.

(21) Appl. No.: 18/283,785

(22) PCT Filed: Mar. 30, 2022

(86) PCT No.: PCT/EP2022/058460
§ 371 (c)(1),
(2) Date: Sep. 22, 2023

(87) PCT Pub. No.: WO2022/207730
PCT Pub. Date: Oct. 6, 2022

(65) Prior Publication Data

US 2024/0087505 A1 Mar. 14, 2024

(30) Foreign Application Priority Data

Mar. 31, 2021 (FR) ...................................... 2103309

(51) Int. Cl.
*G09G 3/32* (2016.01)

(52) U.S. Cl.
CPC ......... *G09G 3/32* (2013.01); *G09G 2310/027* (2013.01); *G09G 2310/065* (2013.01);
(Continued)

(58) Field of Classification Search
None
See application file for complete search history.

(56) References Cited

U.S. PATENT DOCUMENTS

2018/0342191 A1* 11/2018 Cok .......................... G09G 3/32
2020/0194408 A1* 6/2020 Robin ................. H01L 25/0753
(Continued)

FOREIGN PATENT DOCUMENTS

CN 110191539 A 8/2019
WO WO 2018/185433 A1 10/2018

OTHER PUBLICATIONS

International Search Report and Written Opinion for International Application No. PCT/EP2022/058460, mailed Sep. 19, 2022.
(Continued)

*Primary Examiner* — Dorothy Harris
(74) *Attorney, Agent, or Firm* — Wolf, Greenfield & Sacks, P.C.

(57) ABSTRACT

A display pixel including at least one light-emitting diode, a circuit for driving the light-emitting diode, and first, second, third, and fourth conductive pads. The driver circuit is powered with a first power supply voltage received between the first and second pads. The light-emitting diode is powered with a first binary signal, received between the third and second pads, and alternating between a second power supply voltage, greater than the first voltage, and a third voltage, smaller than the first voltage. The driver circuit is configured to determine a digital signal based on the values of a second binary signal on the fourth pad received during each of first pulses of the first binary signal at the third voltage and to control the light-emitting diode from the digital signal.

13 Claims, 5 Drawing Sheets

(52) U.S. Cl.
CPC ... *G09G 2310/08* (2013.01); *G09G 2330/021* (2013.01); *G09G 2330/028* (2013.01)

(56) References Cited

U.S. PATENT DOCUMENTS

2021/0110758 A1* 4/2021 Rossini ................... H01L 25/18
2021/0111157 A1* 4/2021 Rossini ............... H01L 25/0655

OTHER PUBLICATIONS

International Preliminary Report on Patentability for International Application No. PCT/EP2022/058460, mailed Oct. 12, 2023.

* cited by examiner

LIGHT EMITTING DIODE DISPLAY PIXEL

This application is a national stage filing under 35 U.S.C. § 371 of International Patent Application Serial No. PCT/EP2022/058460, filed Mar. 30, 2022, which claims priority to French patent application FR21/03309, filed Mar. 31, 2021. The contents of these applications incorporated herein by reference in their entireties.

TECHNICAL BACKGROUND

The present disclosure concerns a display screen having its display pixels comprising light-emitting diodes.

PRIOR ART

A pixel of an image corresponds to the unit element of the image displayed by a display screen. For the display of color images, the display screen generally comprises, for the display of each pixel of the image, at least three components, also called display sub-pixels, which each emit a light radiation substantially in a single color (for example, red, green, and blue). The superposition of the radiations emitted by the three display sub-pixels provides the observer with the colored sensation corresponding to the pixel of the displayed image. In this case, the assembly formed by the three display sub-pixels used for the display of a pixel of an image is called display pixel of the display screen. Each display sub-pixel may comprise a light source, particularly a light-emitting diode.

The display pixels may be distributed in an array, each display pixel being located at the intersection of a row (or line) and of a column of the array. Generally, each row of display pixels is successively selected, and the display pixels of the selected row are programmed to display the desired image pixels.

An active array is a screen drive architecture enabling to maintain all the pixel rows active for the entire duration of an image, conversely to arrays said to be passive, where each row is only active for a time T=Tframe/N (where Tframe is the duration of the image and N is the number of lines of the screen). This enables to increase the luminosity of the display screen. Further, it is possible to send low voltage or current levels on the array control lines, which enables to display bigger data flows.

In the context of a screen based on light-emitting diodes of micrometer-range dimensions formed on electronic circuits, the size of the light-emitting diode circuit is generally smaller than the size of the image pixel due to the high intrinsic luminosity of light-emitting diodes. One of the solutions used thus is to deposit these unit light-emitting diodes on a support (also called panel) containing the drive electronics. Another solution comprises using display pixels comprising light-emitting diodes and a circuit for controlling the light-emitting diodes. It is then spoken of smart pixels. This particularly enables to simplify the forming of an active array, since the control electronics of the light-emitting diodes of the display pixel is for the most part embedded in the display pixel. Document WO 2018/185433 describes an example of a smart pixel.

For a smart pixel, the number of conductive pads of the smart pixel, used for the electric connection of the smart pixel to the support, imposes the dimensions of the smart pixel, particularly due to the minimum size of these pads and to the minimum space to be provided between these pads. To limit the number of conductive pads, it is known to deliver a single power supply voltage to the display pixels, and each display pixel internally generates one or a plurality of decreased power supply voltages, particularly for the biasing of components of the control electronics.

The static power consumption of a display pixel corresponds to the electric power consumed by the display pixel when the latter emits no light. It may be formed of the leakage currents of components or currents necessary to the internal operation of the display pixel control circuit. In the context of smart pixels, a significant part of the static power consumption originates from the generation of power supply voltages internally to the smart pixel.

It may be envisaged to provide an additional conductive pad, on each smart pixel, to supply the smart pixel with the decreased power supply voltage so that it is not generated within the smart pixel. However, this may cause an increase in the dimensions of the smart pixel, which is not desirable.

The tendency is to the increase of the number of display pixels of the display screen. The static power consumption of the display pixels may then become a critical factor. Indeed, for a so-called 4K display screen having a resolution of 2,160 by 3,840 display pixels, the static power consumption of the display screen may be greater than 150 W.

There is a need to decrease the static power consumption of the display screen.

SUMMARY

An object of an embodiment is to provide a display screen comprising light-emitting diodes overcoming all or part of the disadvantages of existing display screens comprising light-emitting diodes.

Another object of an embodiment is for the display pixels to have dimensions smaller than 200 μm, which limits the number of interconnections between the display pixel and the support of the display pixels.

An embodiment provides a display pixel for a display screen, comprising at least one light-emitting diode, a circuit for driving the light-emitting diode, and first, second, third, and fourth electrically-conductive pads, the driver circuit being at least partly powered with a first power supply voltage received between the first and second electrically-conductive pads, the light-emitting diode being powered with a first binary signal received between the third and second electrically-conductive pads, the first binary signal alternating between a second power supply voltage, greater than the first power supply voltage, and a third voltage, smaller than the first power supply voltage, the driver circuit being configured to determine a digital signal based on the values of a second binary signal on the fourth electrically-conductive pad received during each of first pulses of the first binary signal at the third voltage and to control the light-emitting diode from the digital signal.

According to an embodiment, the driver circuit is configured to control the light-emitting diode by pulse-width modulation from the digital signal.

According to an embodiment, the display pixel only comprises the first, second, third, and fourth electrically-conductive pads.

According to an embodiment, the driver circuit is configured to turn on or turn off the light-emitting diode at the rate of second pulses of the first binary signal at the third voltage.

According to an embodiment, the driver circuit is configured to determine a clock signal and a third binary signal based on the second binary signal.

According to an embodiment, the driver circuit comprises a circuit for storing binary data determined during each first pulse based on the third binary signal.

According to an embodiment, the second binary signal is intended to comprise a mixture of third pulses having the same duration and of fourth pulses having the same duration longer than the duration of each third pulse, the driver circuit being configured to deliver the clock signal at the same rate as the third and fourth pulses and the third binary signal equal to a first state or to a second state according to the succession of the third and fourth pulses.

An embodiment also provides a display screen comprising an array of display pixels such as previously defined, the display screen further comprising circuits for delivering, for each display pixel, the first power supply voltage between the first and second electrically-conductive pads, the first binary signal between the third and second electrically-conductive pads, and the second binary signal on the fourth electrically-conductive pad.

According to an embodiment, the delivery circuits are configured to maintain the first electrically-conductive pad at a first substantially constant potential, the second electrically-conductive pad at a second substantially constant potential, and the third electrically-conductive pad at a third potential which alternates between first and second values, either the first value is greater than the first potential and the second value is equal to the second potential, or the first value is equal to the first potential and the second value is smaller than the second potential.

According to an embodiment, the delivery circuits are configured to deliver the third voltage equal to the zero voltage.

According to an embodiment, the delivery circuits are configured to deliver the second binary signal alternating between two potentials, the difference in absolute value between the two potentials being smaller than the second power supply voltage.

According to an embodiment, the delivery circuits are configured to deliver the first binary signal comprising, for the display of an image, the first pulse at the third voltage of a first duration and a succession of second pulses, each second pulse having a second duration shorter than the first duration.

According to an embodiment, the durations between two successive pairs of second pulses increase or decrease.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DESCRIPTION OF THE EMBODIMENTS

Like features have been designated by like references in the various figures. In particular, the structural and/or functional features that are common among the various embodiments may have the same references and may dispose identical structural, dimensional and material properties. For the sake of clarity, only the steps and elements that are useful for an understanding of the embodiments described herein have been illustrated and described in detail.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings or to a display screen in a normal position of use.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements. Further, a signal which alternates between a first constant state, for example, a low state, noted "0", and a second constant state, for example, a high state, noted "1", is called a "binary signal". The high and low states of different binary signals of a same electronic circuit may be different. In practice, the binary signals may correspond to voltages or to currents which may not be perfectly constant in the high or low state. Further, in the following description, the source and the drain of a MOS transistor are called "power terminals" of the insulated gate field-effect transistor, or MOS transistor.

Further, unless indicated otherwise, when it is spoken of a voltage at a conductive pad, the difference between the potential at said conductive pad and a reference potential, for example, the ground, taken as equal to 0 V, is considered.

Unless specified otherwise, the expressions "around", "approximately", "substantially" and "in the order of" signify within 10%, and preferably within 5%. Further the expression "substantially constant" means which varies by less than 10% over time with respect to a reference value.

Figure 1:
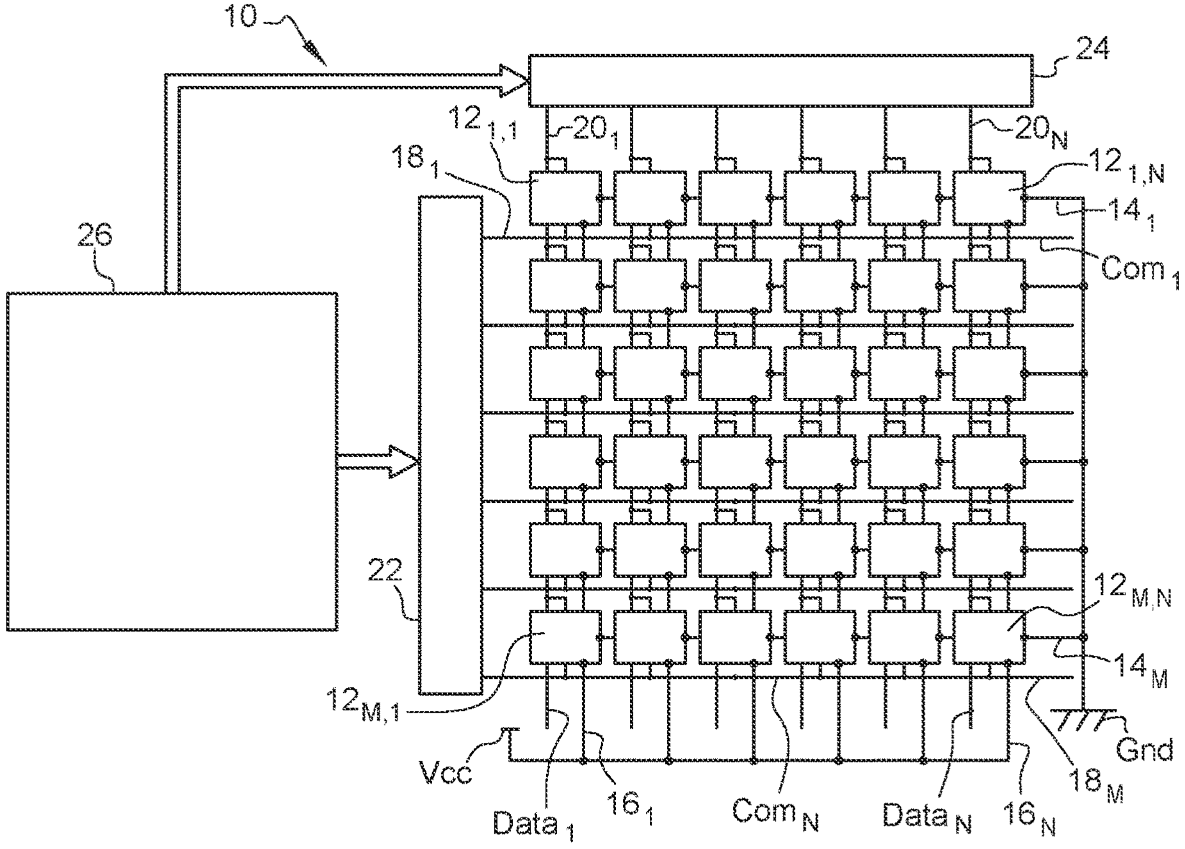
Fig. 1 PRIOR ART
FIG. 1 partially and schematically shows a known example of a display screen.

FIG. 1 partially and schematically shows a known example of a display screen 10. Display screen 10 comprises display pixels $\mathbf{12}_{i,j}$, for example, arranged in M rows and in N columns, M being an integer varying from 1 to 8,000 and N being an integer varying from 1 to 16,000, i being an integer varying from 1 to M, and j being an integer varying from 1 to N. As an example, in FIGS. 1, M and N are equal to 6. Each display pixel $\mathbf{12}_{i,j}$ is coupled to a source of a low reference potential Gnd, for example, the ground, via an electrode 141 and to a source of a high reference potential Vcc via an electrode $\mathbf{16}_j$. As an example, electrodes $\mathbf{14}_i$ are shown as being aligned along the rows in FIG. 1 and electrodes $\mathbf{16}_j$ are shown as being aligned along the columns in FIG. 1, the reverse layout being possible. The power supply voltage of the display screen corresponds to the voltage between high reference potential Vcc and low reference potential Gnd. The power supply voltage particularly depends on the arrangement of the light-emitting diodes and on the technology according to which the light-emitting diodes are manufactured. As an example, the power supply voltage may be in the order of from 4 V to 5 V.

For each row, the display pixels $12_{i,j}$ in the row are coupled to a row electrode 181. For each column, the display pixels $12_{i,j}$ in the column are coupled to a column electrode $20_j$. Display screen 10 comprises a selection circuit 22 coupled to row electrodes $18_i$ and adapted to delivering a selection and timing signal $Com_i$ on each row electrode 181. Display screen 10 comprises a data delivery circuit 24 coupled to column electrodes $20_j$ and adapted to delivering a data signal $Data_j$ on each column electrode $20_j$. Selection circuit 22 and control circuit 24 are controlled by a circuit 26, for example comprising a microprocessor.

Figure 2:
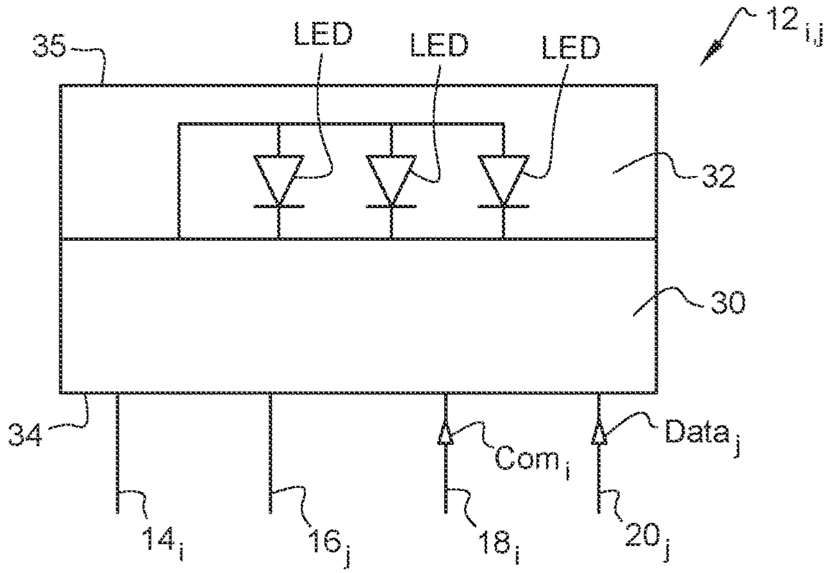
Fig. 2 PRIOR ART
FIG. 2 is a very simplified cross-section view of a known example of a display pixel.
Figure 3:
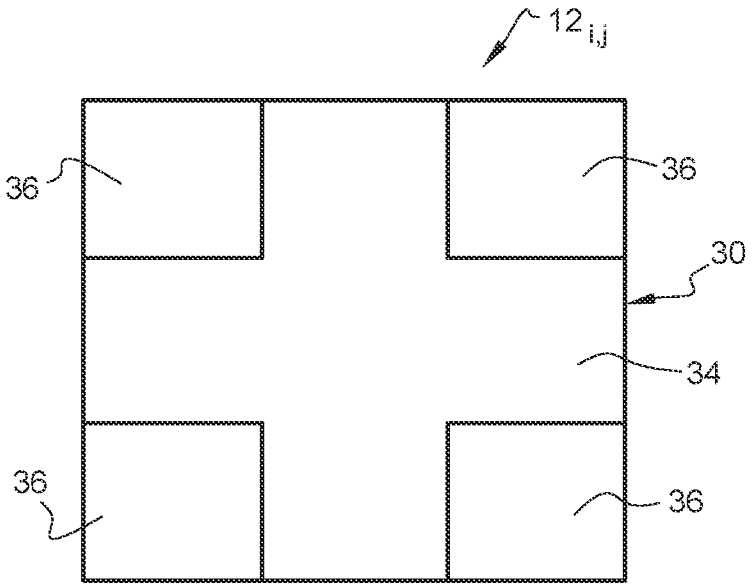
Fig. 3 PRIOR ART
FIG. 3 is a bottom view of the display pixel of FIG. 2.

FIG. 2 is a very simplified cross-section view of a known example of display pixel $12_{i,j}$ and FIG. 3 is a bottom view of display pixel $12_{i,j}$. Each display pixel $12_{i,j}$ comprises a control circuit 30 covered with a display circuit 32. Display circuit 32 comprises at least one light-emitting diode LED, preferably at least three light-emitting diodes LED. The display pixel comprises a lower surface 34 and an upper surface 35 opposite to lower surface 34, surfaces 34 and 35 being preferably planar and parallel. Control circuit 30 further comprises conductive pads 36, not shown in FIG. 2, on lower surface 34. Control circuit 30 may correspond to an integrated circuit comprising electronic components, particularly insulated gate field effect transistors, also called MOS transistors, or thin film transistors, also called TFTs. Preferably, display circuit 32 only comprises light-emitting diodes LED and the conductive elements of these light-emitting diodes LED, and control circuit 30 comprises all the electronic components necessary to the control of the light-emitting diodes LED of display circuit 32. As a variant, display circuit 32 may also comprise other electronic components in addition to light-emitting diodes LED. Light-emitting diodes LED may be 2D light-emitting diodes, also called planar light-emitting diodes, comprising a stack of planar layers, or 3D light-emitting diodes, each comprising a three-dimensional semiconductor element covered with an active area. In FIG. 2, the light-emitting diodes are shown as being connected with a common anode. It may however be desirable to arrange light-emitting diodes LED according to another configuration. As an example, the light-emitting diodes may be connected with a common cathode, or be connected independently from one another.

According to an embodiment, display pixel $12_{i,j}$ comprises three display sub-pixels emitting light at first, second, and third wavelengths. According to an embodiment, the first wavelength corresponds to blue light and is within the range from 430 nm to 490 nm. According to an embodiment, the second wavelength corresponds to green light and is within the range from 510 nm to 570 nm. According to an embodiment, the third wavelength corresponds to red light and is within the range from 600 nm to 720 nm.

Each conductive pad 36 is intended to be connected to one of electrodes $14_i$, $16_j$, $18_i$, $20_j$ schematically shown in FIG. 2. A first conductive pad 36 is coupled to the source of low reference potential Gnd. A second conductive pad is coupled to the source of high reference potential Vcc. A third conductive pad 36 is coupled to row electrode $18_i$ and receives selection and timing signal $Com_i$. A fourth conductive pad 36 is coupled to column electrode $20_j$ and receives data signal $Data_j$. The dimensions of conductive pads 36 and the layout of conductive pads 36 on surface 34 are particularly imposed by the rules of design of display pixel $12_{i,j}$ and by the method of assembly of display pixels $12_{i,j}$ in display screen 10.

Figure 4:
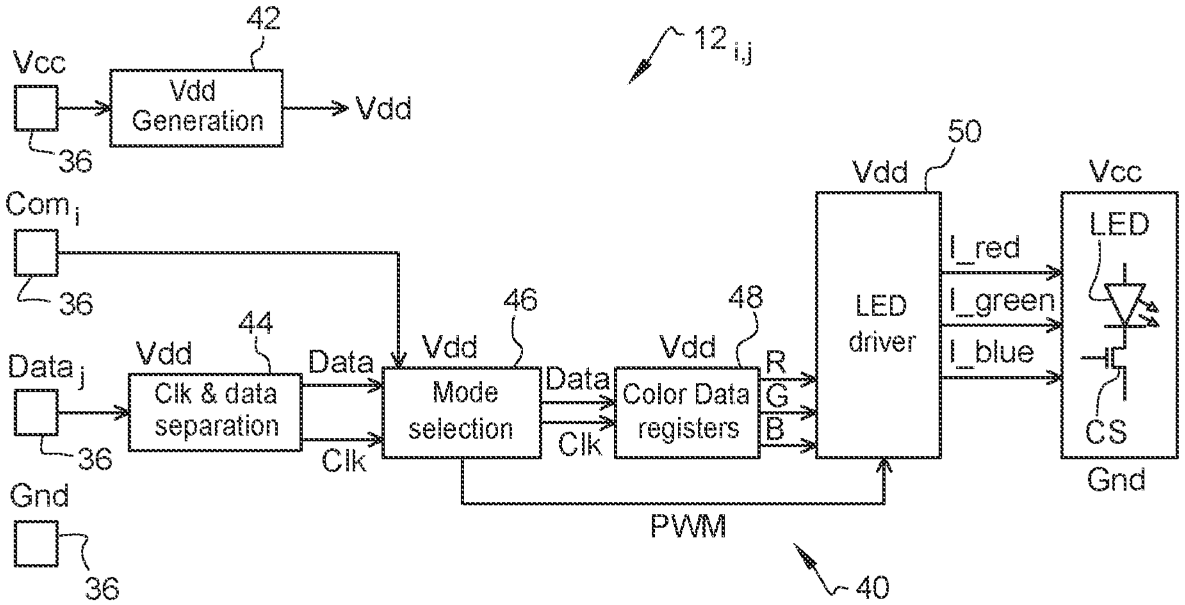
Fig. 4 PRIOR ART
FIG. 4 shows a known example of a block diagram of the display pixel of FIG. 2.

FIG. 4 shows a known example of a block diagram of a display pixel $12_{i,j}$ of display screen 10. In FIG. 4, above each block, the power supply voltage used to power the electronic components of the blocks has been indicated.

According to an example, display pixel $12_{i,j}$ comprises at least three light-emitting diodes, a single light-emitting diode LED being shown in FIG. 4. Each light-emitting diode LED is series-coupled to a controllable current source CS, for example comprising a MOS transistor. In the present example, for each light-emitting diode LED, the anode of light-emitting diode LED is for example coupled to the conductive pad 36 receiving high reference potential Vcc and the cathode of light-emitting diode LED is for example coupled to a terminal of controllable current source CS, the other terminal of controllable current source CS being coupled to the conductive pad 36 receiving low reference potential Gnd.

Display pixel $12_{i,j}$ further comprises a circuit 40 for driving controllable current source CS. Driver circuit 40 may particularly comprise electronic components such as MOS transistors. It may be desirable to use a decreased power supply voltage, smaller than 4 V, for example in the order of 1 V or of 1.8 V, to power the electronic components of driver circuit 40, this decreased power supply voltage for example corresponding to the voltage likely to be applied between the power terminals of the MOS transistors. For this purpose, display pixel $12_{i,j}$ comprises a circuit 42 (Vdd Generation) for delivering, from power supply voltage Vcc, a decreased power supply voltage Vdd particularly used for the power supply of driver circuit 40. Circuit 42 for example comprises a voltage divider.

According to an embodiment, detection and timing signal $Com_i$, received at one of the conductive pads 36 of each display pixel $12_{i,j}$, is a binary signal alternating between a low state "0" and a high state "1", the low state corresponding to low reference potential Gnd and the high state "1" corresponding to a low voltage, for example, approximately 1 V, smaller than decreased power supply voltage Vdd. Data signal $Data_j$ is a binary signal alternating between a low state "0" and a high state "1", the low state corresponding to low reference potential Gnd and the high state "1" corresponding to a low voltage, for example, approximately 1 V, smaller than decreased power supply voltage Vdd.

Driver circuit 40 comprises a circuit 44 (Clk & data separation) coupled to the conductive pad 36 receiving data signal $Data_j$ and delivering, from data signal $Data_j$, a clock signal Clk and data Data. Driver circuit 40 comprises a circuit 46 (Mode selection) receiving signals Clk and Data, coupled to the conductive pad 36 receiving selection and timing signal $Com_i$, and configured to deliver signals Clk and Data to a storage circuit 48 (Color Data registers) or to deliver a PWM signal to a circuit 50 (LED driver) for controlling the controllable current source CS associated with each light-emitting diode LED. Storage circuit 48 is configured to store color signals R, G, B representative of the image pixel to be displayed. Circuit 50 is adapted to controlling the controllable current sources CS coupled to light-emitting diodes LED with signals I_red, I_green, and I_blue, obtained from color signals R, G, B, and from signal PWM.

As will be described hereafter, to limit the number of conductive pads 36 per display pixel $12_{i,j}$, data signals $Data_j$ enable both the determination, by each display pixel $12_{i,j}$, of a clock signal and of the color signals R, G, B representative of the light intensities desired for the radiations at the first, second, and third wavelengths.

Figure 5:
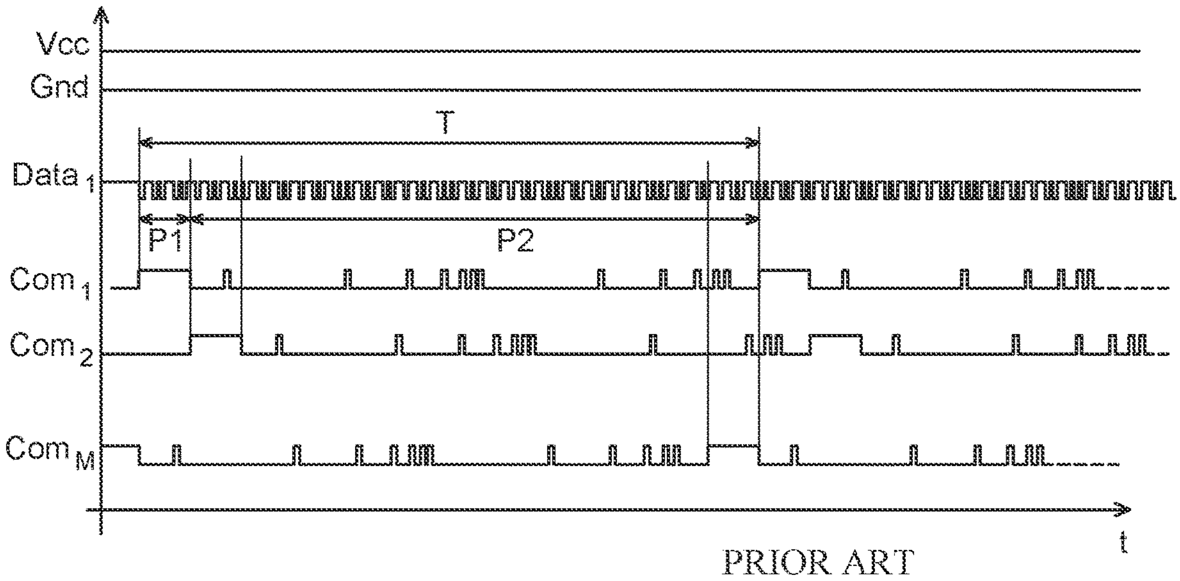
FIG. 5 shows known examples of timing diagrams of signals of the display pixel of FIG. 4.

FIG. 5 shows a timing diagram of signals received by display pixels $\mathbf{12}_{i,j}$ having the structure shown in FIG. 4 during the display of an image on display screen 10.

Potentials Vcc and Gnd are substantially constant. The image pixels of a new image to be displayed are successively displayed from the row of rank 1 to the row of rank M. Call frame duration T the duration separating two successive selections of the same row of display screen 10. Timing diagrams of signals $Com_i$ and $Data_1$ will be detailed for the row of rank 1, knowing that the timing diagrams of signals $Com_i$ are similar to the timing diagram of signal $Com_i$, although shifted in time. The display of a new image pixel by a display pixel $\mathbf{12}_{1,j}$, with j varying from 1 to N, of the row of rank 1 comprises a first phase P1 followed by a second phase P2. During phase P1, data signals $Data_j$ are transmitted to each display pixel $\mathbf{12}_{1,j}$ of the row of rank 1, only signal $Data_1$ being shown in FIG. 5. During second phase P2, the light-emitting diodes of each display pixel $\mathbf{12}_{1,j}$ are controlled from the color signals R, G, B, determined based on data signals $Data_j$.

During first phase P1, selection and timing signal $Com_i$ is set to state "1". The setting to state "1" of signal $Com_i$ for a long duration is detected by the circuit 46 of each display pixel $\mathbf{12}_{1,j}$ of the row of rank 1 and thus enables to select the display pixels $\mathbf{12}_{1,j}$ of this row, while the display pixels of the other rows are not selected. During first phase P1, data signals $Data_j$ are transmitted on column electrodes $\mathbf{20}_j$. For each display pixel $\mathbf{12}_{1,j}$, circuit 44 determines clock signal Clk and data Data based on the pulses of data signal $Data_j$. As an example, each pulse of data signal $Data_j$ may have a first duration or a second duration, longer than the first duration. Signal Clk may correspond to a sequence of pulses of same durations having their rising edges coinciding, to within a possible constant offset, with the rising edges of the pulses of data signal $Data_j$. Data Data may correspond to a binary signal at state "0" when the pulse of signal $Data_j$ has the first duration, and at state "1" when the pulse of signal $Data_j$ has the second duration. Circuit 46, selected by signal $Com_i$ at state "1", delivers, at the rate of clock signal Clk, the data Data which are stored in circuit 50 in the form of digital signals R, G, B having their bits provided by the successive values of signal Data. The end of first period P1 for a row corresponds to the beginning of first period P1 for the next row.

According to an embodiment, the light-emitting diodes of display pixel $\mathbf{12}_{1,j}$ are controlled by pulse-width modulation or control PWM. For this purpose, during second phase P2, selection and timing signal $Com_i$ exhibits the repetition of a succession of pulses at state "1" which are transmitted by the circuit 46 of each display pixel $\mathbf{12}_{1,j}$ of the row of rank 1 to circuit 50 (signal PWM) to rate the operation circuit 50 for the control of light-emitting diodes LED by pulse-width modulation. The number of pulses in the succession corresponds to the number of bits of each digital signal R, G, and B. As an example, when current source CS corresponds to a MOS transistor, this transistor is turned on or is turned off, at the rate of the PWM pulses, according to the value "0" or "1" of each bit of color signal R, G, or B, starting by the most significant bit, this transistor being maintained on or off until the next pulse of signal $Com_i$. The duration between two successive pulses of signal $Com_i$ is divided each time by two, so that the total duration for which the light-emitting diode is on depends on the value of color signal R, G, or B. The succession of pulses of signal $Com_i$ is repeated until the next first phase P1 of the row of rank 1, a single repetition being illustrated as an example in FIG. 5.

The static power consumption of display pixel $\mathbf{12}_{i,j}$ is for a significant part due to electronic components other than the MOS transistors of driver circuit 40, particularly the circuit 42 for delivering decreased power supply voltage Vdd. The current tendency is to increase the number of display pixels $\mathbf{12}_{i,j}$ of display screen 10. The static power consumption of the display pixels may then become a critical factor. Indeed, for a so-called 4K display screen 10, having a resolution of 2,160 by 3,840 display pixels, the static power consumption of display screen 10 may be greater than 150 W.

It may be envisaged to provide an additional conductive pad 36, on each display pixel $\mathbf{12}_{i,j}$, in addition to those shown in FIG. 3, to deliver to display pixel $\mathbf{12}_{i,j}$ an additional high reference potential Vdd, so that decreased power supply voltage Vdd is not generated within display pixel $\mathbf{12}_{i,j}$. However, it may not be possible to add an additional conductive pad 36 without increasing the lateral dimensions of display pixel $\mathbf{12}_{i,j}$, which may not be desirable.

According to an embodiment according to the invention, one of conductive pads 36 is used to receive high power supply voltage Vcc and another conductive pad 26 is used to receive decreased power supply voltage Vdd without modifying the total number of conductive pads 36. Thereby, the generation of the decreased power supply voltage is no longer performed within each display pixel $\mathbf{12}_{i,j}$ and the static power consumption of the display screen is decreased. Further, the lateral dimensions of display pixels $\mathbf{12}_{i,j}$ may not be modified. However, to operate with the same number of conductive pads 36, the structure of the driver circuit 40 of display pixel $\mathbf{12}_{i,j}$ is modified and some of the signals supplied to display pixel $\mathbf{12}_{i,j}$ are modified.

Figure 6:
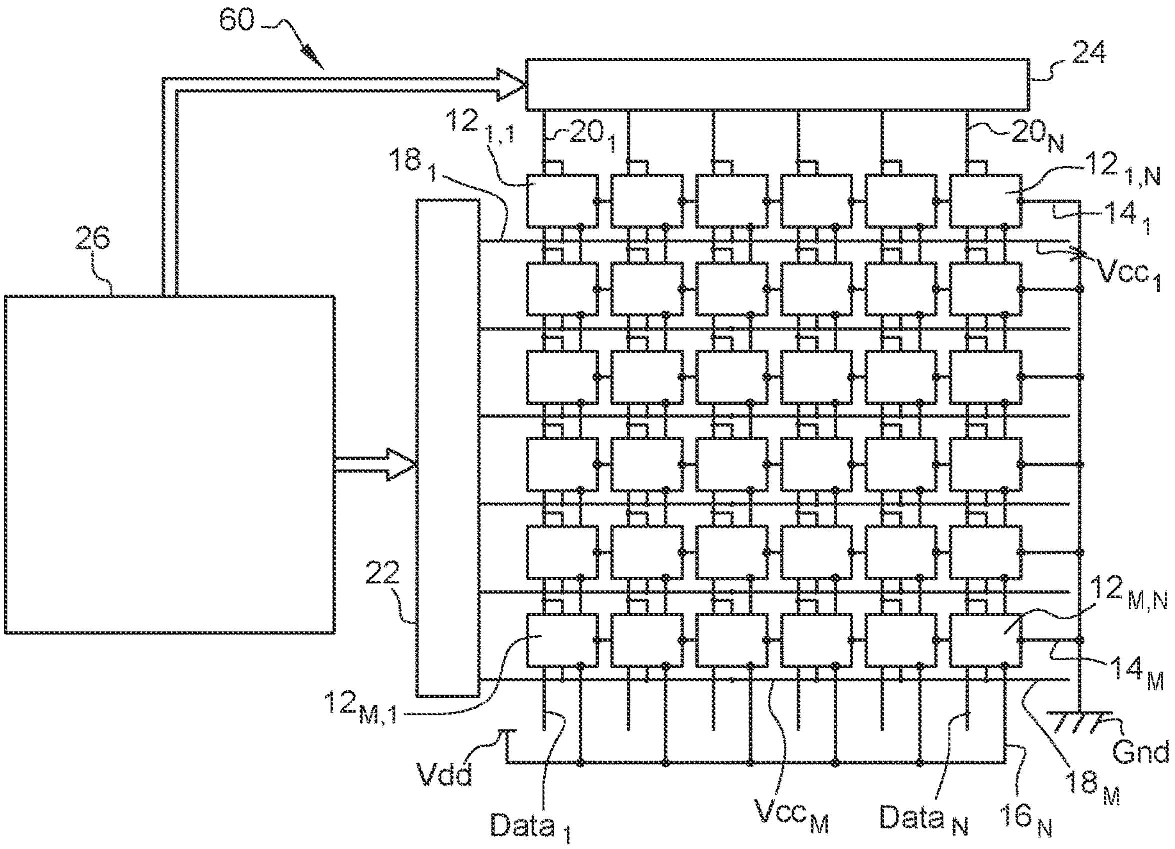
FIG. 6 partially and schematically shows an embodiment according to the invention of a display screen.

FIG. 6 partially and schematically shows an embodiment of a display screen 60. Display screen 60 comprises all the elements of the display screen 10 of FIG. 1, with the difference that electrodes $\mathbf{16}_j$, with j varying from 1 to N, deliver decreased power supply voltage Vdd and that row electrodes $\mathbf{18}_i$, with i varying from 1 to M, deliver high power supply voltage $Vcc_i$ which contains a portion of the timing signal. Column electrodes $\mathbf{20}_j$ deliver data signals $Data_j$ and electrodes $\mathbf{14}_i$ deliver the low reference potential, in the same way as for display screen 10.

Figure 7:
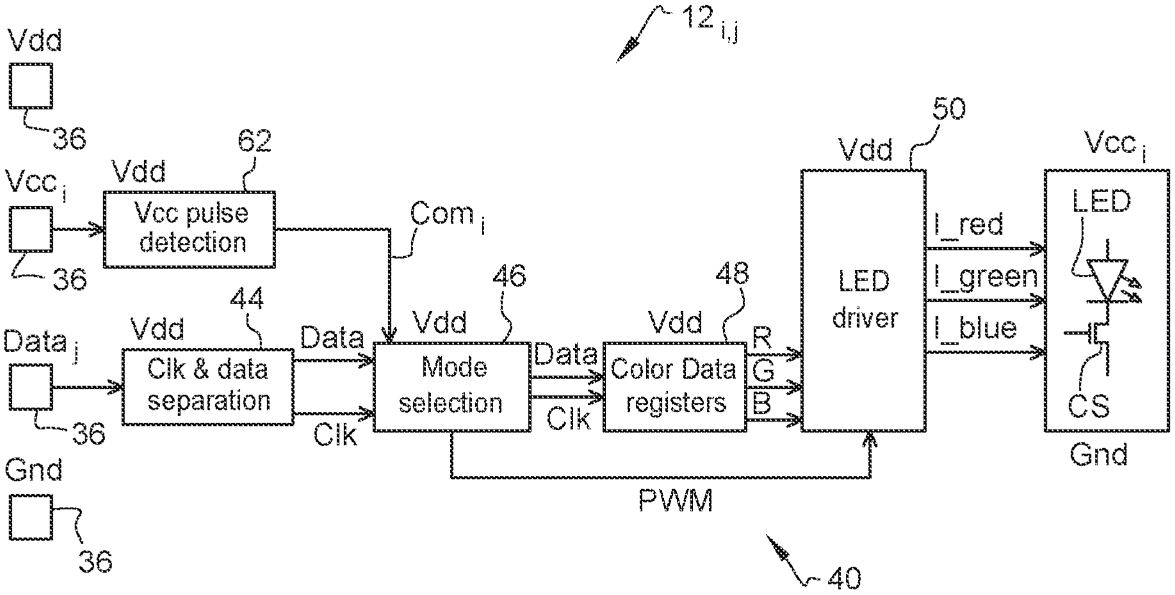
FIG. 7 shows a block diagram of an embodiment according to the invention of a display pixel of the display screen of FIG. 6.

FIG. 7 shows an example of a block diagram of the display pixel $\mathbf{12}_{i,j}$ of display screen 60. The display pixel $\mathbf{12}_{i,j}$ of display screen 60 has the same structure as the display pixel $\mathbf{12}_{i,j}$ of the display screen 10 shown in FIG. 4, with the different that it does not comprise circuit 42 for delivering decreased power supply voltage Vdd and that it further comprises a circuit 62 (Vcc pulse detection) for detecting pulses of signal $Vcc_i$, which delivers selection and timing signal $Com_i$ to selection circuit 46. Decreased power supply voltage Vdd is directly delivered by one of conductive pads 36.

Figure 8:
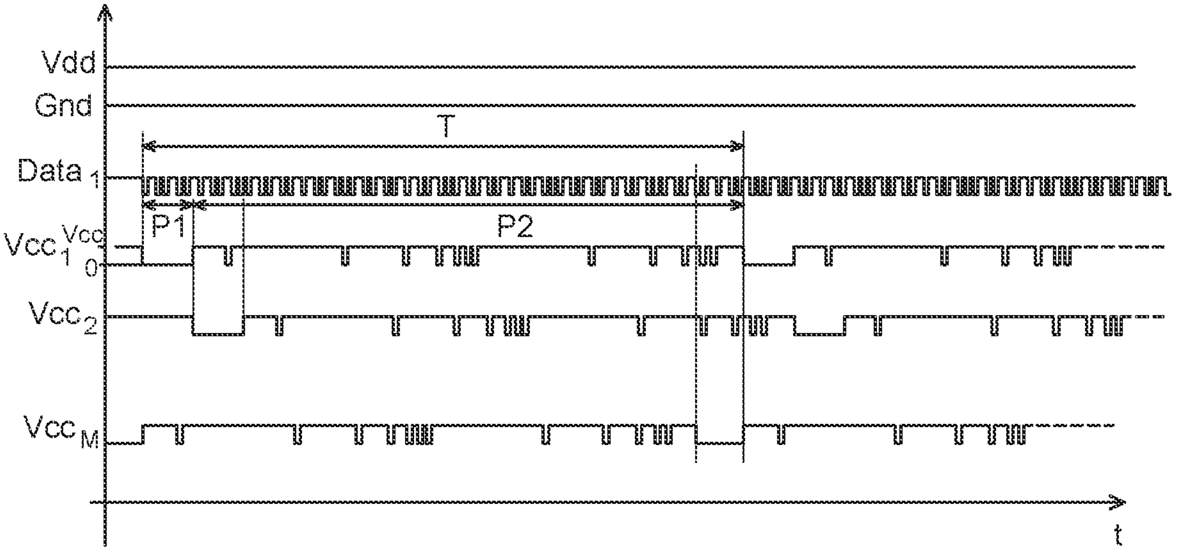
FIG. 8 shows timing diagrams of signals of the display pixel of FIG. 7.

FIG. 8 shows a timing diagram of signals received by display pixels $\mathbf{12}_{i,j}$ having the structure shown in FIG. 7 during the display of an image on display screen 60.

Potentials Vdd and Gnd are substantially constant. Each signal $Vcc_i$, with i varying from 1 to M, is a binary signal which varies between a state "1" where signal $Vcc_i$ is equal to the previously-described high power supply voltage Vcc, for example in the order of from 4 V to 5 V, and a state "0", where signal $Vcc_i$ is substantially equal to low reference potential GND. Each signal $Vcc_i$ exhibits a first phase P1 followed by a second phase P2. During phase P1, data signals $Data_j$ are transmitted to each display pixel $\mathbf{12}_{i,j}$ of the row of rank i, only signal $Data_1$ being shown in FIG. 8.

During second phase P2, the light-emitting diodes of each display pixel $12_{i,j}$ are controlled from the color signals R, G, B, determined based on data signals $Data_j$.

Signal $Com_i$, supplied by the circuit 62 of each display pixel $12_{i,j}$, thus varies between states "0" and "1" complementarily to signal $Vcc_i$, state "0" for example corresponding to low reference potential GND and state "1" corresponding to a low voltage, for example, approximately 1 V, for example equal to decreased power supply voltage Vdd. The operation of the rest of driver circuit 40 is thus identical to what has been previously described in relation with FIG. 5. In particular, during first phase P1, signal $Vcc_i$ is set to state "0". The setting to state "0" of signal $Vcc_i$ for a long duration is detected by the circuits 62 and 46 of each display pixel $12_{i,j}$ of the row of rank i and thus enables to select the display pixels $12_{i,j}$ of this row, while the display pixels of the other rows are not selected. During first phase P1, data signals $Data_j$ are transmitted on column electrodes $20_j$. For each display pixel $12_{i,j}$, circuit 44 determine clock signal Clk and data Data based on the pulses of data signal $Data_j$, for example, as previously described. Circuit 46, selected by signal $Com_i$ at state "1", delivers, at the rate of clock signal Clk, the data Data which are stored in circuit 50 in the form of digital signals R, G, B having their bits provided by the successive values of signal Data.

During second phase P2, signal $Vcc_i$ exhibits the repetition of a succession of pulses at state "0" which are converted by the circuit 62 of each display pixel $12_{i,j}$ of the row of rank i into pulses at state "1" of signal $Com_i$. These pulses are transmitted by the circuit 46 of each display pixel $12_{i,j}$ of the row of rank i to circuit 50 (PWM signal) to rate the operation of circuit 50 for the control of light-emitting diodes LED by pulse-width modulation, for example, as previously described.

Advantageously, the durations of the pulses at state "0" of each signal $Vcc_i$ during phases P1 and P2 are shorter than at least 75% the duration of frame T, preferably at least 80%, more preferably at least 85% of the duration of frame T. Signal $Vcc_i$ is thus most of the time equal to high power supply voltage Vcc, and the power supply voltage of light-emitting diodes LED is substantially not disturbed by the pulses of signal $Vcc_i$. This would not have been the case if the high power supply voltage had been transported by data signals $Data_j$, which substantially permanently vary between the high and low states.

In the embodiment previously described in relation with FIG. 7, light-emitting diodes LED are in a common anode configuration. It may however be desirable to arrange light-emitting diodes LED in a common cathode configuration.

Figure 9:
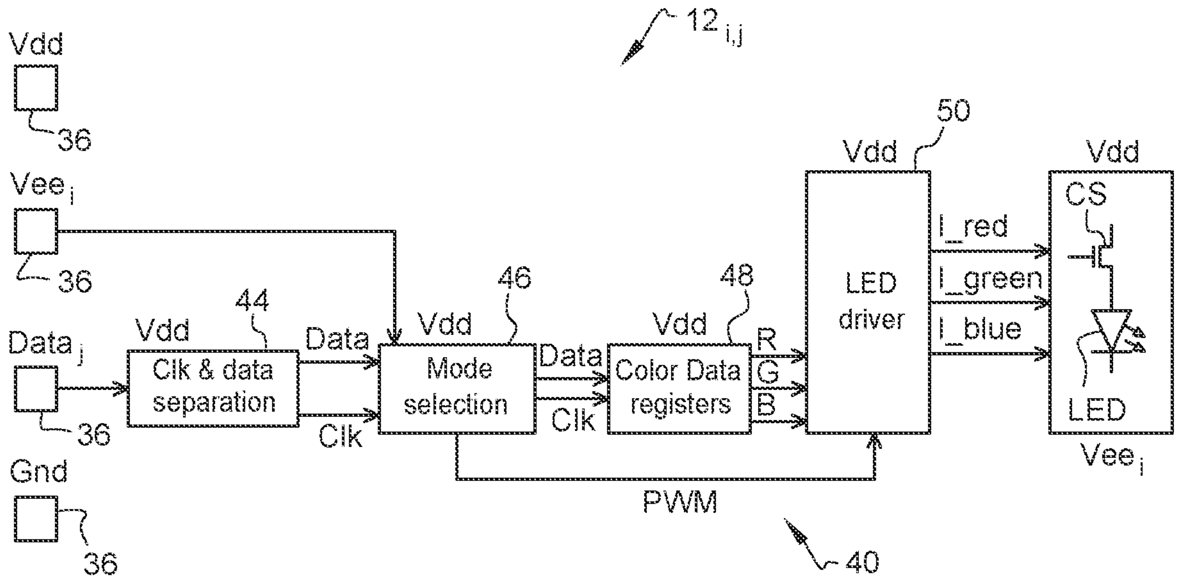
FIG. 9 shows a block diagram of another embodiment according to the invention of a display pixel of the display screen of FIG. 6.

FIG. 9 shows an example of block diagrams of a display pixel $12_{i,j}$ of display screen 60 where the light-emitting diodes LED of display pixel $12_{i,j}$ are in a common cathode configuration. The display pixel $12_{i,j}$ shown in FIG. 9 has the same structure as the display pixel $12_{i,j}$ shown in FIG. 7, with the difference that signal $Vcc_i$ is replaced with a signal $Vee_i$, that the cathode of light-emitting diode LED is for example coupled to the conductive pad 36 receiving signal $Vee_i$, that the anode of light-emitting diode LED is for example coupled to a terminal of controllable current source CS, the other terminal of controllable current source CS being connected to the conductive pad 36 receiving decreased power supply voltage Vdd.

Figure 10:
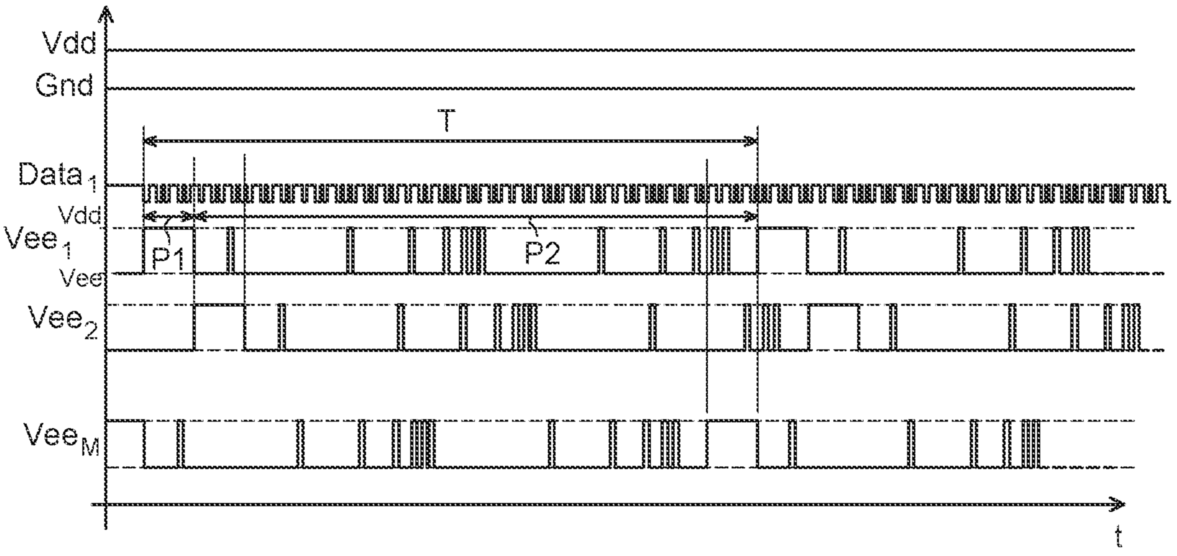
FIG. 10 shows timing diagrams of signals of the display pixel of FIG. 9.

FIG. 10 shows a timing diagram of signals received by display pixels $12_{i,j}$ having the structure shown in FIG. 9 at the display of an image on display screen 60. Each signal $Vee_i$, i varying from 1 to M, is a binary signal which varies between a state "1" where signal $Vee_i$ is equal to the previously-described decreased power supply voltage Vdd, for example in the order of 1 V or of 1.8 V, and a state "0", where signal $Vee_i$ is at a reference potential smaller than reference potential GND, for example, at a negative potential, particularly in the order of −2.2 V or of −3 V, so that the difference between potentials Vdd and Vee is equal to the previously-described high power supply voltage Vcc. According to an embodiment, signal $Vee_i$ varies like the previously-described signal $Com_i$. In the present embodiment, circuit 62 is not present since, since signal $Vee_i$ varies like signal $Com_i$, it may directly be used by circuit 46. However, since the dynamics of signal $Vee_i$ is different from that of signal $Com_i$, it may be desirable to provide for circuit 62 to be adapted to delivering signal $Com_i$ from signal $Vee_i$.

Various embodiments and variants have been described. Those skilled in the art will understand that certain features of these various embodiments and variants may be combined, and other variants will occur to those skilled in the art. In particular, the PWM modulation may be internally generated in the control circuit 30 of display pixel $12_{i,j}$ to avoid using signal $Com_i$ to generate it. Other embodiments may also not use a PWM modulation but a linear driving of light-emitting diode LED. Other embodiments may also use other electro-optical components such as organic light-emitting diodes.

Finally, the practical implementation of the described embodiments and variations is within the abilities of those skilled in the art based on the functional indications given hereabove. In particular, regarding the second embodiment described in FIG. 9, it may be advantageous to use structures of SOI (Silicon on insulator) type to facilitate the management of negative voltages.

The invention claimed is:

1. Display pixel for a display screen, comprising at least one light-emitting diode, a circuit for driving the light-emitting diode, and first, second, third, and fourth electrically-conductive pads, the driver circuit being at least partly powered with a first power supply voltage received between the first and second electrically-conductive pads, the light-emitting diode being powered with a first binary signal received between the third and second electrically-conductive pads, the first binary signal alternating between a second power supply voltage, greater than the first power supply voltage, and a third voltage, smaller than the first power supply voltage, the driver circuit being configured to determine a digital signal based on the values of a second binary signal on the fourth electrically-conductive pad received during each of first pulses of the first binary signal at the third voltage and to control the light-emitting diode from the digital signal.

2. Display pixel according to claim 1, wherein the driver circuit is configured to control the light-emitting diode by pulse-width modulation from the digital signal.

3. Display pixel according to claim 1, only comprising the first, second, third, and fourth electrically-conductive pads.

4. Display pixel according to claim 1, wherein the driver circuit is configured to turn on or turn off the light-emitting diode at the rate of second pulses of the first binary signal at the third voltage.

5. Display pixel according to claim 1, wherein the driver circuit is configured to determine a clock signal and a third binary signal based on the second binary signal.

6. Display pixel according to claim 5, wherein the driver circuit comprises a circuit for storing binary data determined at each first pulse based on the third binary signal.

7. Display pixel according to claim 5, wherein the second binary signal is intended to comprise a mixture of third pulses having the same duration and of fourth pulses having the same duration longer than the duration of each third pulse, the driver circuit being configured to deliver the clock signal at the same rate as the third and fourth pulses and the third binary signal equal to a first state or to a second state according to the succession of the third and fourth pulses.

8. Display screen comprising an array of display pixels according to claim 1, the display screen further comprising circuits for delivering, for each display pixel, the first power supply voltage between the first and second electrically-conductive pads, the first binary signal between the third and second electrically-conductive pads, and the second binary signal on the fourth electrically-conductive pad.

9. Display screen according to claim 8, wherein the delivery circuits are configured to maintain the first electrically-conductive pad at a substantially constant first potential, the second electrically-conductive pad at a second substantially constant potential, and the third electrically-conductive pad at a third potential which alternates between first and second values, either the first value is greater than the first potential and the second value is equal to the second potential, or the first value is equal to the first potential and the second value is smaller than the second potential.

10. Display screen according to claim 8, wherein the delivery circuits are configured to deliver the third voltage equal to the zero voltage.

11. Display screen according to claim 8, wherein the delivery circuits are configured to deliver the second binary signal alternating between two potentials, the difference in absolute value between the two potentials being smaller than the second power supply voltage.

12. Display screen according to claim 8, wherein the delivery circuits are configured to deliver the first binary signal comprising, for the display of an image, the first pulse at the third voltage of a first duration and a succession of second pulses, each second pulse having a second duration shorter than the first duration.

13. Display screen according to claim 12, wherein the durations between two pairs of second successive pulses increase or decrease.

* * * * *